United States Patent [19]

Hoch

[11] Patent Number: 4,540,191
[45] Date of Patent: Sep. 10, 1985

[54] STATIC DISCHARGE PREVENTION SYSTEM FOR A LARGELY NON-METALLIC FUEL TANK

[75] Inventor: John J. Hoch, Beaver Dam, Wis.

[73] Assignee: Deere & Company, Moline, Ill.

[21] Appl. No.: 588,614

[22] Filed: Mar. 12, 1984

[51] Int. Cl.³ ............................................. B60K 15/02
[52] U.S. Cl. ...................................... 280/5 A; 361/215
[58] Field of Search .............. 280/5 A, 5 R, 5 H, 5 C, 280/5 D; 361/215, 216, 217, 212

[56] References Cited

U.S. PATENT DOCUMENTS

| 1,524,423 | 1/1925 | Chapman | 361/217 |
| 3,967,660 | 7/1976 | Russell | 141/95 |
| 4,319,303 | 3/1982 | Thorn | 361/216 |
| 4,411,441 | 10/1983 | Marcheix et al. | 280/5 A |

Primary Examiner—Joseph F. Peters, Jr.
Assistant Examiner—Donn McGiehan

[57] ABSTRACT

A fuel tank is grounded to a vehicle chassis by means including a metal filler neck portion forming a sole electrical conducting portion of the tank, a metal vent tube connected between the metal filler neck portion and a metal tank mounting bracket secured to the vehicle chassis and a ground cable or wire connected to the filler neck portion and dangling into the tank.

5 Claims, 2 Drawing Figures

4,540,191

STATIC DISCHARGE PREVENTION SYSTEM FOR A LARGELY NON-METALLIC FUEL TANK

BACKGROUND OF THE INVENTION

The present invention relates to vehicle fuel systems and more specifically relates to methods of grounding fuel tanks so as to prevent the buildup of static electricity.

Fuel flowing from a hose or container into an ungrounded fuel tank will cause the formation of a static charge as will the movement of fuel within the tank. The grounding of a metal fuel tank so as to eliminate static charge buildup is an easy task since it merely requires an electrical conductor be connected between some point on the tank and the vehicle frame. However, a different situation is presented when the majority of the fuel tank is made of a non-metallic material such as plastic.

Now there is provided a way of grounding a largely non-metallic fuel tank so as to prevent a static charge buildup.

SUMMARY OF THE INVENTION

According to the present invention there is provided a novel, largely non-metallic fuel tank assembly and more specifically there is provided an assembly which is effectively grounded for preventing the formation of a static electrical charge.

An object of the invention is to provide a simple ground assembly in combination with a largely non-metallic fuel tank.

A more specific object of the invention is to provide a ground assembly, for a largely non-metallic fuel tank, which includes a metal ring clamped within the tank filler neck, a metal vent tube connected between the ring and a metal hangar for the tank, and a ground cable coupled to the ring and extending into the tank.

These and other objects, features and advantages of the present invention will become apparent to those skilled in the art from the description which follows and from the drawing.

DESCRIPTION OF THE PREFERRED EMBODIMENT

Figure 2:
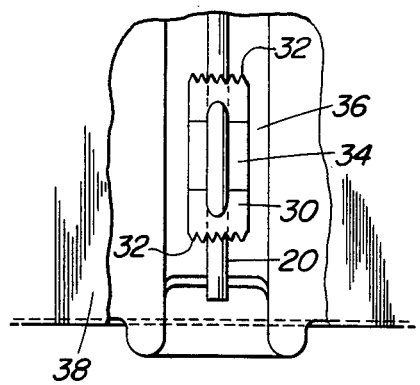
FIG. 2 is a view taken along line 2—2 of FIG. 1 and showing the clip which forms the electrical connection between the vent tube and tank bracket.
Figure 1:
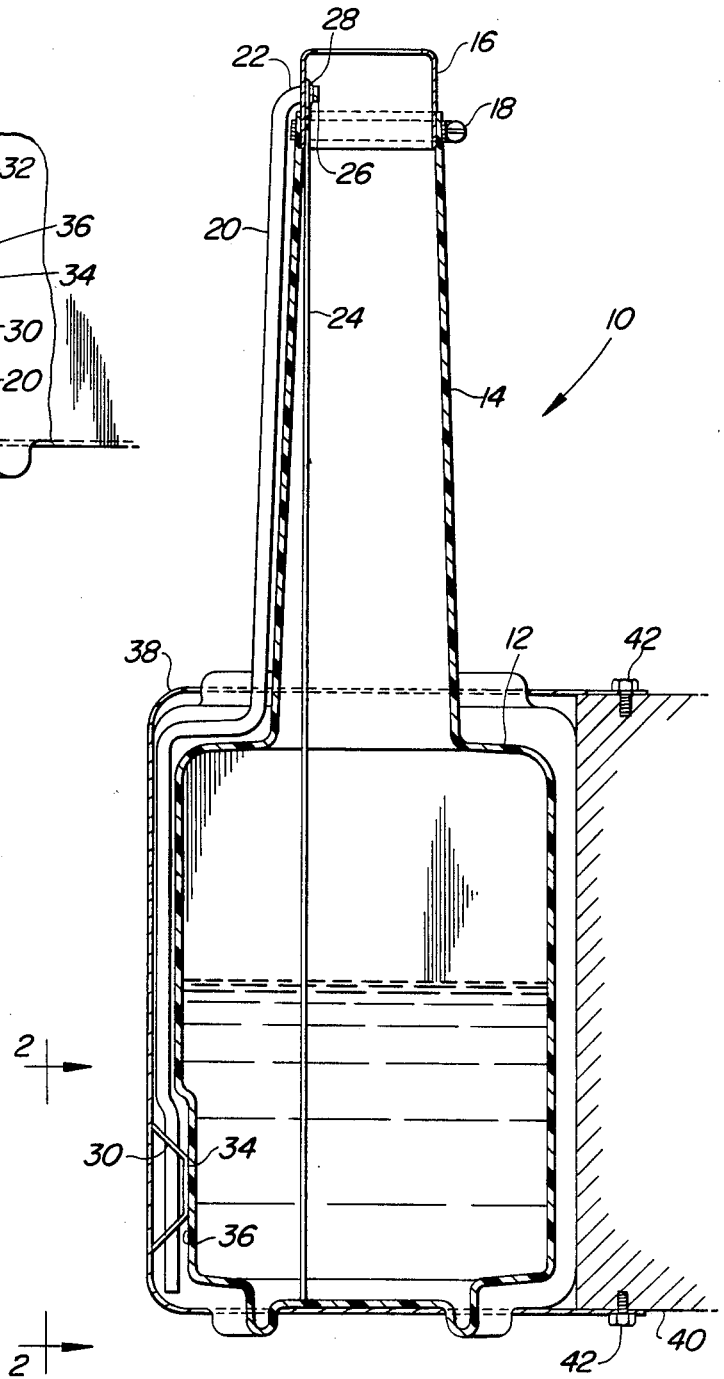
FIG. 1 is a vertical sectional view taken through a mainly non-metallic fuel tank incorporating an electrical ground assembly constructed in accordance with the present invention.

Referring now to the drawing, there is shown a grounded fuel tank assembly 10. The tank assembly 10 includes a tank 12 including an elevated tubular filler neck or spout 14. Except for an upper neck portion 16, the tank is formed of a non-metallic material such as plastic. The upper neck portion 16 of the tank 12 is metal and is held within the upper end of the plastic portion of the neck 14 by a hose clamp 18. The metal upper neck portion 16 could be threaded or otherwise adapted for receiving a cap (not shown) of common construction. A vent tube 20 extends along the outside of the tank 12 and has a bent upper end 22 received in a hole provided in the metal neck portion 16. A ground cable 24 extends to the bottom of the inside of the tank and has a connector 26, at its upper end, received on the vent tube end 22. A push nut 28 is received on the tube end 22 and thus holds the cable connector 26 on the end 22 and secures the tube to the filler neck portion 16. A substantially U-shaped, spring metal clip 30 has opposite legs received on the tube 20, with legs having teeth 32 formed on their ends. The clip 30 has a flat surface 34 engaged with a flat surface 36 of the tank 12 and the teeth 32 bear against a metal tank mounting bracket 38 which is connected to a vehicle chassis member 40 by fasteners 42.

In operation, the metal upper portion 16 of the filler neck 14, the vent tube 20, and the tank mounting bracket 34 together with the ground cable 24 cooperate to ground the tank 12 such that static electricity does not build up during the filling of the tank or during the operation of the vehicle carrying the tank.

I claim:

1. A grounded fuel tank assembly comprising: a vehicle chassis; a fuel tank mounted to the chassis and including an elevated filler neck; said filler neck including at least an upper portion forming a sole electrical current conducting portion of said tank; a first conducting element means secured to said upper portion of the filler neck and extending down into said tank; and a second conducting element means connected in conducting relationship between said upper portion of the filler neck and the chassis.

2. The grounded fuel tank assembly defined in claim 1 wherein said first conducting element means is a ground cable extending down into the tank and having an upper end connected in electrical communication with said upper portion of the filler neck.

3. The grounded fuel tank assembly defined in claim 1 wherein said second conducting element means is in the form of a metal vent tube having an upper end projecting through said upper portion of the filler neck.

4. The grounded fuel tank assembly defined in claim 3 wherein said first electrical current conducting means is a cable having a connector at its upper end received on the upper end of said vent tube.

5. The grounded fuel tank assembly defined in claim 3 wherein said tank is held in a metal tank mounting bracket; said vent tube carrying a metal clip engaged with said tank and having teeth engaged with the bracket; and said bracket being mounted to said chassis.

* * * * *